Figure 1:
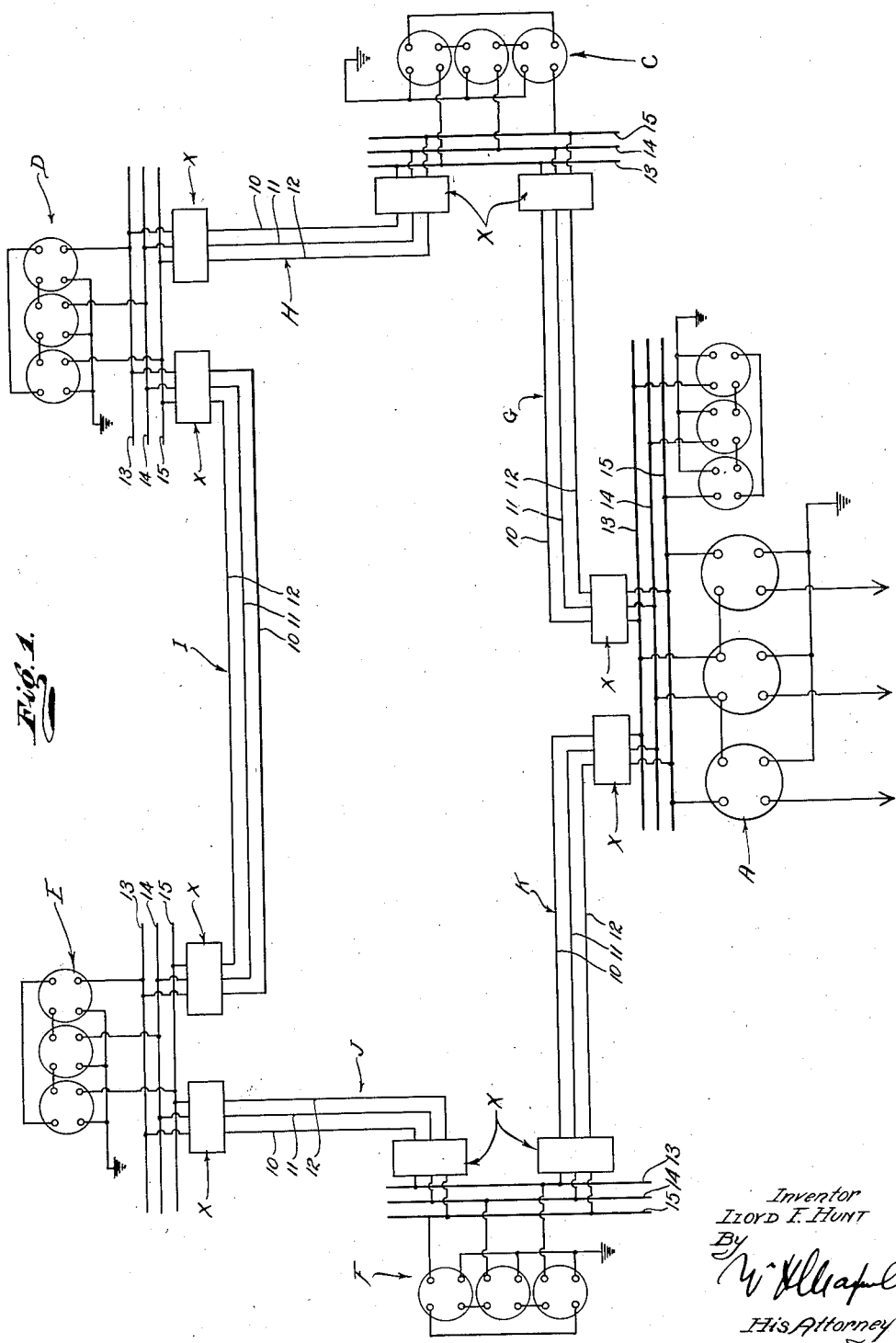

Patented Aug. 18, 1936

2,051,378

UNITED STATES PATENT OFFICE 2,051,378

PROTECTIVE SYSTEM FOR POWER LINES

Lloyd F. Hunt, Glendale, Calif.

Application January 21, 1935, Serial No. 2,733

10 Claims. (Cl. 175—294)

This invention relates to a system of protection for electrical transmission or distribution lines and has particular reference to a system suitable for and effective as applied to complex distribution systems, and it is a general object of the present invention to provide a protective system which is dependable, sensitive, and rapid in detecting phase to phase and also phase to ground faults.

My present invention is an improvement upon that general type or form of protective equipment which is the subject of Letters Patent of the United States No. 1,940,303, entitled System for power line protection, issued December 19, 1933, to Lloyd F. Hunt and Fred B. Doolittle, and Patent No. 1,965,896, entitled System for power line protection, issued July 10, 1934 to Lloyd F. Hunt and Fred B. Doolittle.

In the distribution of electrical energy, that is, in the operation of a power transmission line or system, it is necessary to protect the system and units of equipment connected therewith against fault conditions as, for instance, against phase to phase faults and also against phase to ground faults. Phase to phase faults may be dependably and successfully handled through protective systems such as those which are the subject of the patents above mentioned and in the case of certain types of systems as, for instance, radial feeder systems effective protection against phase to phase and phase to ground faults can be gained by a system such as I set forth and claim in my co-pending application entitled Protective system for electrical distributing system filed on even date herewith.

My present invention provides a protective system employing the general principles set forth in the above mentioned patents for protection against phase to phase faults and provides also effective, dependable protection against phase to ground faults. The present invention is applicable to systems having interconnected feeders, that is, to systems such as are commonly known as complex systems. In the following disclosure of the invention, I will describe it as applied to a loop system, and I will make detailed reference to a typical form and embodiment of the invention and to typical conditions that the invention will handle.

It is a primary object of the present invention to provide a system of line protection suitable for use in protecting a complex system and which is effective in detecting phase to phase and also phase to ground faults without cascading time delay as is ordinarily employed in protective systems intended for the class of use for which the present invention is designed.

Another object of this invention is to provide improvements in a system of the general type set forth in the patents above mentioned, whereby such system includes effective, dependable and sensitive ground detection means, including directional means making the system applicable to a complicated distribution system.

Figure 2:
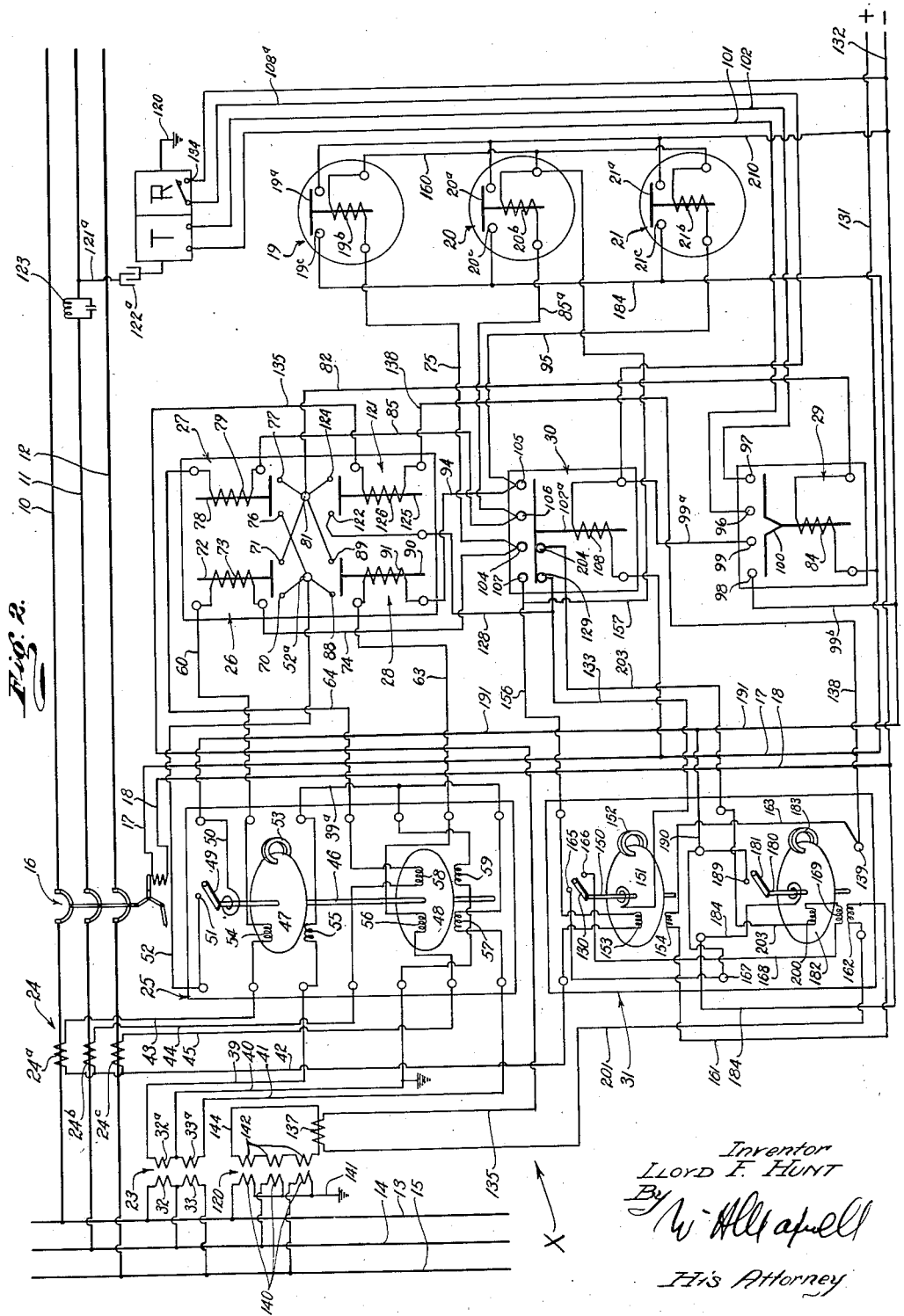

The various objects and features of this invention will be best and more fully understood from the following detailed description of a typical form of the invention applied to a complex distribution system of the loop type throughout which description I make reference to the accompanying drawings in which:

Fig. 1 is a diagrammatic view of the loop system, generally, showing a power supply station feeding a loop which includes a plurality of line sections connected by sub-stations, and Fig. 2 is an enlarged, detailed, diagrammatic view of a unit of equipment such as is provided by the present invention at each end of each line.

The loop system which I have illustrated for the purpose of facilitating an understanding of the present invention includes, generally, a main station or power supply station designated generally as A, a plurality of sub-stations C, D, E, and F connected with the supply station A and with each other by lines G, H, I, J, and K. The lines and sub-stations are connected in series and with the main supply station A to form a complex system of the loop type.

The system of the present invention is applied to or embodied in the loop or sectional system illustrated in the diagram Fig. 1, so that it will function to cut out a line section on which a fault occurs without disturbing the other sections of the system. The invention provides, generally, a unit X of the protective system at each end of each line section, which units are suitably related or interconnected, as will appear from the following description so that they function to selectively disconnect a faulted line section whether the fault be a phase to phase fault or a phase to ground fault. The several units X embodied in the system may be alike or, in fact, identical, and, therefore, I will proceed with a detailed description of the construction and operation of a single unit X, it being understood that such description may apply equally to each unit X included in the entire loop system.

The portion of the system of the present invention which functions to protect against phase to phase faults may employ the general inventions which are the subject of the patents above identified.

Each of the lines, G, H, I, J, and K entering into the system includes main conductors 10, 11, and 12, the circuit being a three-phase circuit. The three main conductors 10, 11, and 12 of each line extend to and connect with the bus bars 13, 14, and 15 of the stations connected by the lines.

Each unit X is connected at the end of one of the lines connecting adjacent stations whether they be sub-stations or a sub-station and the main supply station and includes the general combination and arrangement of elements that I will now describe.

Each unit X as shown in Fig. 2 includes a circuit breaker 16 connected in the main lines 10, 11, and 12 immediately ahead of the connection of such lines with the bus bars 13, 14, and 15. The circuit breaker may be adapted for operation by suitable power as, for instance, it may be connected for operation by current from a source independent of the system carried by lines 17 and 18 connected with power lines 131 and 132. The breaker operating circuit includes a plurality of relays which control said circuit and are governed by other elements of the unit as will be hereinafter described. I have illustrated three short time delay over-current phase relays 19, 20, and 21 and ground relay 31 connected in the breaker operating circuit so that the closing of any one of said relays completes the circuit and results in operation of the circuit breaker. The relays 19, 20, and 21 have normally opened contacts 19ª, 20ª and 21ª, respectively, for controlling the circuit to the circuit breaker 16.

Transformers 23 and 24 are connected with the bus bars and conductors 10, 11, and 12 to be energized by the main power circuit. Transformer 23 is a potential transformer and transformer 24 is a current transformer. A directional relay 25 responsive to direction of three-phase power flow is connected with the transformers and with fast overcurrent relays 26, 27, and 28. A transmitting relay 29 is operated by the relays just mentioned to start operation of a single transmitter T and to energize the coil of a lock-out relay 30. The transmitter T is controlled through contacts 96 and 97 while the coil of relay 30 is controlled through contacts 98 and 99. The closing of the contacts of the lock-out relay 30 cuts out relays 19, 20, 21 and a ground relay 31 by short-circuiting the winding of relay 19 through contacts 104 and 107, and relay 20 through contacts 104 and 106, and by short-circuiting the winding of relay 21 through contacts 105 and 107, and by opening the circuit of one of the torque windings of relay 31 through contacts 129 and 204.

The potential transformer 23 has primary windings 32 and 33 suitably connected with the bus bars of the station and has secondary windings 32ª and 33ª energized from the windings 32 and 33, respectively, and connected with the directional relay 25 by suitable connections 39, 40, and 41. Connection 40 is grounded.

The current transformer 24 includes secondary windings 24ª, 24ᵇ, and 24ᶜ related to the main lines 10, 11, and 12, respectively. One pole of each winding is connected to a common line 42 which extends to the relay 31 which will be hereinafter described. The other poles of the windings 24ª, 24ᵇ, and 24ᶜ are connected with lines 43, 44, and 45, respectively, which connect to current coils of relay 25 as will be hereinafter described.

The power directional relay 25 includes, generally, a unit 46 mounted for rotation, which unit carries discs 47 and 48 and a contact 49. The contact 49 is connected with a line 50 and is adapted to cooperate with a contact 51 connected by a line 52 with a terminal 52ª at the group of relays 26, 27, and 28. Rotation of the unit 46 is damped by a fixed field element 53 suitably related to the disc 47, and the direction of torque on the unit 46 is governed by windings 54 and 55 related to the disc 47 and windings 56 and 57, 58, and 59 related to the disc 48. One pole of the winding 54 is connected with the transformer winding 24ª by connection 43, while the other pole of the winding 54 is connected by connection 60 with one terminal of the winding 73 of the relay 26. One pole of the winding 55 is connected by line 39 with transformer 23 while the other pole of the winding 55 is connected by a common connection 39ª with a pole of winding 59 and a pole of winding 57. One pole of the winding 56 is connected with transformer winding 24ᶜ by connection 45, while the other pole of the winding 56 is connected by connection 63 with one terminal of the winding 91 of the relay 28. One pole of the winding 58 is connected by connection 44 with transformer winding 24ᵇ, while the other pole of winding 58 is connected by connection 64 with one pole of the winding 79 of relay 27. One pole of winding 59 is connected by connection 40 with potential transformer 23 while the other pole of winding 59 is connected by the common connection 39ª with a pole of winding 55 and a pole of winding 57. One pole of winding 57 is connected by connection 41 with transformer 23.

The relay 26 is a fast or instantaneous over-current relay including stationary contacts 70 and 71 and a movable contact 72 controlled by winding 73. The contact 70 is connected with terminal 52ª which is connected with contact 51 of relay 25 by connection 52, while the contact 71 is connected with terminal 81 which is connected by line 82 with one pole of winding 84 of relay 29. One pole of relay winding 73 of relay 26 is connected by line 74 with terminal 104 of relay 30. The terminal 104 is connected by a line 75 with one pole of winding 19ᵇ of relay 19.

The relay 27 is a fast or instantaneous over-current relay including stationary contacts 76 and 77, a movable contact 78 and a winding 79 controlling the contact 78. The contact 76 is connected with terminal 52ª, which in turn is connected with contact 70 of relay 26, while contact 77 is connected with terminal 81, which in turn is connected with contact 71 of relay 26. One pole of winding 79 is connected with the line 64 from relay 25 while the other pole is connected with terminal 106 of relay 30 by a connection 85. Terminal 106 is connected by line 85ª with one terminal of winding 20ᵇ of relay 20.

Relay 28 is a fast or instantaneous over-current relay having stationary contacts 88 and 89, a movable contact 90 and a winding 91 controlling the contact 90. Contact 88 is connected with terminal 52ª, above described, while contact 89 is connected with the terminal 81, above described. One pole of winding 91 is connected with the relay 25 by connection 63, while the other pole of winding 91 is connected with terminal 105 of relay 30 by line 94. Terminal 105 is in turn connected by a line 95 with one terminal of winding 21ᵇ of relay 21.

The transmitting relay 29 includes stationary contacts 96, 97, 98, and 99, a movable contact 100 and a winding 84 controlling the contact 100. The contacts 96 and 97 are connected with transmitter T by connections 101 and 102, respectively, and are energized upon actuation of the contact 100. Contact 98 is connected with power line 132 by connection 99ᵇ while contact 99 is connected with winding 108 of relay 30 by line 99ᵃ for completing the circuit between winding 108 of relay 30 and power line 132 upon actuation of the contact 100.

The lock-out relay 30 includes the contacts 104, 105, 106 and 107, hereinabove referred to, and a movable element 107ᵃ controlled by winding 108. One pole of the winding 108 of relay 30 is connected by line 99ᵃ with contact 99 of relay 29 and by line 108ᵃ with receiver R, while the other pole of winding 108 is connected with line 17.

The means provided by the present invention designed primarily to be responsive to phase to ground fault conditions includes, generally, a grounding transformer 120, the relay 31 hereinabove referred to, and a ground over-current relay 121.

The ground over-current relay 121 includes contacts 122 and 124, a movable element 125 for cooperation with the contacts and a coil 126 for controlling the element 125. Contact 122 is connected by a line 128 with a contact 129 of relay 30 and is connected with movable contact 130 of relay 31 by line 133. Contact 124 of relay 121 is connected with terminal 81, hereinabove referred to. The winding 126 of relay 121 has one pole connected by a line 135 with one pole of the transformer winding 137 energized from the transformer 120. The other pole of winding 126 is connected by a line 138 with the terminal 139 of relay 31.

The grounding transformer 120 is shown connected with the bus bars 13, 14 and 15 and in the form illustrated includes three primary windings 140, each having one pole connected with a bus bar and the other with a common ground connection 141. The secondary windings 142 of the ground transformer are connected in series and in a circuit carried by a line 144 which energizes the winding 137.

The relay 31 provided by my invention is related to the grounding transformer to be responsive to ground current which may result from a fault from one phase of the power line to ground and is connected with the current transformer 24 for the detection of the direction of the fault.

The relay 31 includes a movable directional element 150 carrying contact 130, above referred to, and a disc 151. Rotation of the disc 151 is damped by a fixed field element 152 suitably related to the disc. Rotation of the disc 151 is effected through windings 153 and 154 suitably related to the disc. The winding 153 has one pole connected by line 42 with the winding of current transformer 24. The other pole of winding 153 is connected by a line 156 with terminal 107 of relay 30. Line 156 connects with a line 157 which connects with one terminal of winding 20ᵇ of relay 20. The windings of relays 19, 20 and 21 have a common connection 160, as clearly illustrated in Fig. 2. The winding 154 of relay 31 has one pole connected by a line 161 with one pole of a winding 162, as will be hereinafter described. The other pole of winding 154 is connected by a connection 163 with terminal 139 of the relay 31. The movable contact 130 of relay 31 when operated in one direction cooperates with contact 165 and when moved in the other direction cooperates with contact 166. Contact 165 is connected with terminal 167 of relay 31, which is connected with line 190. Line 190 is connected to line 191 which in turn is connected to line 132. The contact 166 is connected by line 168 with one terminal of a winding 169, hereinafter referred to. Movable contact 130 is connected by line 133 with contact 129 of relay 30.

The relay 31 includes a second movable tripping element 180 carrying a contact 181 and a disc 182. Rotation of the disc 182 is damped by a fixed field element 183. The contact 181 is connected by a line 184 with contacts 19ᶜ, 20ᶜ, and 21ᶜ of relays 19, 20, and 21, respectively. The contact 181 is adapted to cooperate with a stationary contact 189 which is connected by line 190 with a line 191 which connects with connection 50 of relay 25 and with line 132 from the source used to operate the breaker and with contact 98 of relay 29 and with the receiver R. The rotation of the disc 182 is effected by the inductive relationship of windings 169 and 162 which produces energization of winding 200, the winding 200 being operable to turn the disc 182. The winding 162 has one pole connected by a line 201 with transformer winding 137 and has the other pole connected by line 161 with winding 154, above described. The winding 169 which is related to the winding 162 has one pole connected by connection 168 with contact 166 and has the other pole connected with one pole of winding 200. The other pole of winding 200 is connected by a line 203 with a contact 204 in relay 30.

In addition to the units and elements hereinabove referred to, the system of the present invention includes a transmitter T and a receiver R in each unit X through which a suitable interconnection is established between the two units X at the ends of a line section. The interconnection may be established in any suitable manner, for instance, it may be a wired connection or, as I have indicated in the diagram, it may be a wired radio connection carried by the line being protected.

The transmitter T and the receiver R have one pole connected to ground through a suitable grounding connection 120 and the other pole connected with one of the lines, for instance, with line 11 through a connection 121ᵃ provided with a coupling capacitor 122ᵃ, the line 11 being provided with a radio frequency trap 123 between the point of connection of line 121ᵃ and the busses. With the arrangement just described, the transmitters and receivers of the units X at the two ends of each line section are connected for cooperation one with the other and are isolated or separated from the transmitters and receivers of the other units X of the system so that a signal sent by any one unit operates only the receiver at the opposite end of the section. Having set forth a typical form of embodiment of my invention, I will now describe its operation under certain more or less usual conditions.

In the case of a phase to phase short on one of the line sections, the current transformer at each end of that line section is energized and the units X at both ends of that line section function the same and as follows. The current transformer 24 being connected with the operating windings of relay 25, as I have above described, causes operation of relay 25 so that contacts 49 and 51 open. The energizing or operating windings of relays 26, 27, and 28 being connected in series to the relay 25 through the connections that I have described the relays 26, 27, and 28 are operated and as a result thereof relay 19 and/or relay 20 and/or relay 21 operates. The relays 19, 20, and 21 being connected with the control or operating means of the breaker 16, the breaker is tripped out or operated when relay 19, 20, or 21 operates. In general, when a phase to phase fault occurs, one or more of the relays 19, 20, or 21 are operated through relays 25 and 26, 27 and/or 28 to trip or operate the breaker 16, this operation occurring because of the fact that the contact 49 of relay 25 is out of engagement with contact 51.

In the event of a phase to phase short on the system located on the bus side of transformer 24, the current from the transformer 24 is reversed in the relays so that the contact 49 of relay 25 engages contact 51. This phase to phase short circuit will cause any one or more of relays 27, 26, 28 to close contacts causing terminals 52a and 81 to be connected together. Closing of contact 49 and contact 51 closes the circuit to relay 29 by connections 52, 82, 131, 50, 191, and 132, as hereinabove described. Operation of relay 29 closes contacts 96 and 97 which control the operation of transmitter T. Transmitter T being put in operation sends a signal over the line to the receiver R of the unit at the opposite end of the line. The operation of relay 29 also causes operation of the lock-out relay 30 through closing of the contacts 98 and 99 of the relay 29. When the lock-out relay 30 is operated it shorts or cuts out the windings of relays 19, 20, and 21 and thus prevents the system from operating to trip the breaker 16. When a signal from the transmitter T is received by the receiver R of the unit X at the opposite end of the line, the contact 134 of that unit X is closed and its relay 30 is operated as a result of the connections above described. When the cut-out relay 30 is operated, the windings of the relays 19, 20, and 21 are shorted or cut out to prevent operation of the breaker 16.

From the foregoing outline of operation, it will be apparent that if a phase to phase fault occurs on a line of the system, the units X at the ends of that line function so that their breakers open, whereas when flow occurs in a line as a result of a fault on another line of the system, the unit X receiving such flow cuts out or becomes locked so that its breaker does not function, and it initiates a signal which is carried by its line to the unit X at the other end of the line, which signal results in the unit X at the said other end of the line locking out so that its breaker does not function.

In the case of a phase to ground fault on a line, the magnitude of flow resulting from such fault is generally insufficient to operate relays 25, 26, 27, 28, 19, 20 and 21 as hereinabove described, but is sufficient when aided by the current from the ground transformer 120 through transformer 137 to operate the directional element 151 of relay 31. A phase to ground fault on a line causes the flow in relay 31 of the unit at the end of the line to be such as to close contacts 130 and 166, which causes energization of winding 200 of relay 31 through induction from winding 162 to winding 169. Energization of winding 200 results in closing of contacts 181 and 189 which, through the connections 132, 191, 190, 184, 18, 17, and 131, results in tripping of the breaker 16.

If the phase to ground fault is on the bus side the action of relay 31 is the same as I have described except that current in winding 153 is reversed, causing contact 130 to close with contact 165. Closing of contact 130 with contact 165 closes the circuit to relay 29 through contacts 122 and 124 of relay 121. Relay 121 is energized from transformer 137 through line 201, winding 162 and 154 of relay 31, line 138, and line 135. Contacts 96 and 97 of relay 29 close the circuit to transmitter T with the result that a signal is sent to the unit X at the other end of the line section to lock it out. Under the condition of operation just described, contact 130 of relay 31 is out of engagement with contact 166 thereof, and, therefore, winding 200 is not energized, and, therefore, contacts 181 and 189 of relay 31 do not close, and, therefore, the breaker 16 of the unit X cannot trip. In the event that a signal is received relay 30 is energized, opening contacts 129 and 204 which control the circuit through the winding 200. When the winding 200 is thus cut out so that it cannot be energized, the unit X is locked out so that its breaker 16 does not trip.

Having described only a typical preferred form and application of my invention, I do not wish to be limited or restricted to the specific form and application herein set forth, but wish to reserve to myself any modifications or variations that may appear to those skilled in the art or fall within the scope of the following claims:

Having described my invention, I claim:

1. A protective system for a sectional current carrying line including, protective units connected with each end of a line and each including a circuit breaker controlling the line, operating means for the circuit breaker, a lockout relay operable to lock out the operating means of the breaker, and means including two movable elements, one a directional element operable in one direction to operate the lockout relay and in the other direction to close an operating circuit to the other element and connected with the line section to be operated by current flow due to a fault, and the other element connected with the line through ground to be operated by ground flow and flow in said circuit to trip the breaker.

2. A protective system for a sectional current carrying line including, protective units connected with each end of a line and each including, a ground transformer connected with the line, a circuit breaker controlling the line, operating means for the circuit breaker, a lockout relay operable to lock out the operating means of the breaker, and means including two movable elements, one a directional element operable in one direction to operate the lockout relay and in the other direction to close an operating circuit to the other element and connected with the line section to be operated by current flow due to a fault, and the other element connected with the line through ground to be operated by ground flow and flow in said circuit to trip the breaker.

3. A protective system for a sectional current carrying line including, protective units connected with each end of a line and each including, a ground transformer connected with the line, a current transformer connected with the line, a circuit breaker controlling the line and including an operating circuit, a lockout relay operable to lock out the operating circuit of the breaker, and means including two movable elements, one a directional element operable in one direction to operate the lockout relay and in the other direction to close an operating circuit to the other element and connected with the line section to be operated by current flow from the current transformer due to a fault, and the other element connected with the line through ground to be operated by ground flow from the ground transformer and flow in the last named circuit to complete the operating circuit of the breaker.

4. A protective system for a sectional current carrying line including, protective units connected with each end of a line and each including, a circuit breaker controlling the line and including an operating circuit, a lockout relay operable to lock out the operating circuit of the breaker, a signal receiver operable to actuate the lockout relay, a signal transmitter, and a ground relay including two movable elements, one a directional element operable in one direction to operate the lockout relay and the signal transmitter and in the other direction to close an operating circuit to the other element and connected with the line section to be operated by current flow due to a fault, and the other element connected with the line through ground to be operated by ground flow and flow in the last named circuit to complete the operating circuit of the breaker.

5. A protective system for a sectional current carrying line including, protective units connected with each end of a line and each including, a ground transformer connected with the line, a current transformer connected with the line, a circuit breaker controlling the line, an operating circuit for the circuit breaker, a lockout relay operable to lock out the operating circuit of the breaker, a signal receiver operable to actuate the lockout relay, a signal transmitter, and a relay including two movable elements, one a directional element operable in one direction to operate the lockout relay and the signal transmitter and in the other direction to close an operating circuit to the other element and connected with the line section to be operated by current flow due to a fault, and the other element connected with the line through ground to be operated by ground flow and flow in the last named circuit to complete the operating circuit of the breaker.

6. A protective system for a sectional current carrying line including, protective units connected with each end of a line section and each including a circuit breaker controlling the line, an operating circuit for the circuit breaker, a time delay overcurrent trip relay controlling the operating circuit of the breaker and operatively connected with a section of the line to be responsive to overcurrent in the line, a lock-out relay for the overcurrent time delay relay, means connected with the said line section whereby the lock-out relay of a unit is operated upon overcurrent flow in a single direction in said section of the line, and a ground relay including two movable elements one a directional element operable in one direction to operate the lock-out relay and in the other direction to close an operating circuit to the other element and connected with the said line section to be operated by flow in said single direction to operate the lock-out relay and the other element connected with the line through ground to be operated by ground flow in the last named circuit to complete the operating circuit of the breaker.

7. A protective system for a sectional current carrying line including, protective units connected with each end of a line section and each including a circuit breaker controlling the line, a time delay overcurrent trip relay controlling the breaker and operatively connected with a section of the line to be responsive to overcurrent in the line, a lock-out relay for the overcurrent time delay relay, means connected with the said line section whereby the cut-out relay of a unit is operated upon overcurrent flow in a single direction in said section of the line, a ground transformer connected with the line, and a ground relay including two movable elements one a directional element operable in one direction to operate the lock-out relay and in the other direction to close an operating circuit to the other element and connected with the said line section to be operated by flow in said single direction to operate the lock-out relay and the other element connected with the line through ground to be operated by ground flow in said circuit to trip the breaker.

8. A protective system for a sectional current carrying line including, protective units connected with each end of a line section and each including a circuit breaker controlling the line, a ground transformer connected with the line, a current transformer connected with the line, a time delay overcurrent trip relay controlling the breaker and operatively connected with a section of the line to be responsive to overcurrent in the line, a lock-out relay for the overcurrent time delay relay, means connected with the said line section through the current transformer whereby the cut-out relay of a unit is operated upon overcurrent flow in a single direction in said section of the line, and a ground relay including two movable elements one a directional element operable in one direction to operate the lock-out relay and in the other direction to close an operating circuit to the other element and connected with the said line section to be operated by flow in said single direction to operate the lock-out relay and the other element connected with the line through ground to be operated by ground flow in said circuit to trip the breaker.

9. A protective system for a sectional multiphase current carrying line including, protective units connected with each end of a line section and each including a circuit breaker controlling the line, a plurality of time delay trip relays controlling the breaker, connecting means connecting each phase of the line with a trip relay whereby a trip relay is operated upon overcurrent flow of predetermined duration on any phase of the line, lock-out means for the trip relays, and connecting means between said line section and the lock-out means of the units whereby the lock-out means of a unit is immediately operated upon overcurrent flow in a single direction in said section of the line, said connecting means including a ground transformer connected with the line section, a current transformer connected with the line section, and a relay including a directional element operated by current from the current transformer, and a tripping element controlled by the directional element and current from the ground transformer.

10. A protective system for a sectional current carrying line including, protective units connected with each end of a line section and each including a circuit breaker controlling the line, a time delay overcurrent trip relay controlling the breaker and operatively connected with a section of the line to be responsive to overcurrent in the line, a lock-out relay for the overcurrent time delay relay, a signal receiver operable to actuate the cut-out relay, a signal transmitter, means connected with the said line section whereby the lock-out relay and the signal transmitter of a unit are operated upon overcurrent flow in a single direction in said section of the line, and a ground relay including two movable elements one a directional element operable in one direction to operate the lock-out relay and the signal transmitter and in the other direction to close an operating circuit to the other element and connected with the said line section to be operated by flow in said single direction to operate the lock-out relay and the other element connected with the line through ground to be operated by ground flow in said circuit to trip the breaker.

LLOYD F. HUNT.